United States Patent
Rao et al.

(10) Patent No.: US 9,831,942 B2
(45) Date of Patent: Nov. 28, 2017

(54) METHODS AND SYSTEMS FOR RECOVERY IN COHERENT OPTICAL NETWORKS

(71) Applicant: Infinera Corp., Annapolis Junction, MD (US)

(72) Inventors: Rajan Rao, Fremont, CA (US); Biao Lu, Saratoga, CA (US); Saurabh Kumar, Menlo Park, CA (US); Baranidhar Ramanathan, Karnataka (IN); Parthiban Kandappan, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/675,002

(22) Filed: Mar. 31, 2015

(65) Prior Publication Data

US 2016/0164596 A1 Jun. 9, 2016

Related U.S. Application Data

(60) Provisional application No. 62/088,081, filed on Dec. 5, 2014.

(51) Int. Cl.
*H04B 10/032* (2013.01)
*H04J 14/02* (2006.01)
*H04Q 11/00* (2006.01)

(52) U.S. Cl.
CPC ........ *H04B 10/032* (2013.01); *H04J 14/0273* (2013.01); *H04J 14/0291* (2013.01); *H04Q 11/00* (2013.01); *H04Q 2011/0081* (2013.01)

(58) Field of Classification Search
CPC ................ H04B 10/032; H04J 14/0287; H04J 14/0289; H04J 14/029; H04J 14/0293; H04J 2203/0001; H04J 2203/0003
(Continued)

(56) References Cited

U.S. PATENT DOCUMENTS

| | | | |
|---|---|---|---|
| 6,594,047 B1 * | 7/2003 | Ballintine | H04J 14/0227 398/79 |
| 7,995,921 B2 | 8/2011 | Grubb | |

(Continued)

OTHER PUBLICATIONS

ITU-T Recommendation G.709 "Interfaces for the optical transport network (OTN)." Dec. 2009.
(Continued)

*Primary Examiner* — Dalzid Singh
(74) *Attorney, Agent, or Firm* — Dunlap Codding PC; David L. Soltz

(57) ABSTRACT

A method for receiving, by circuitry of an optical node adapted for wavelength multiplexing and wavelength switching, over an OSC an optical signal comprising overhead information indicative of status of at least one of an optical layer in an OTN; terminating the optical signal; notifying software of the status of the optical layer; detecting, based on the status of the optical layer, a uni-directional or bi-directional failure of a working path between the optical node and a second optical node, wherein the working path carries data traffic from the first optical node to the second optical node in the OTN when there is no failure in the working path; and switching, triggered by the uni-directional or bi-directional failure of the working path, to select the data traffic from a protection path, wherein the protection path carries data traffic between the optical node and the second optical node.

18 Claims, 11 Drawing Sheets

(58) Field of Classification Search
USPC .......................................................... 398/5
See application file for complete search history.

(56) References Cited

U.S. PATENT DOCUMENTS

| | | | |
|---|---|---|---|
| 8,223,803 B2 | 7/2012 | Sprague | |
| 8,248,913 B1* | 8/2012 | Liu | H04L 45/22 370/216 |
| 2001/0046074 A1* | 11/2001 | Kakizaki | H04B 10/032 398/5 |
| 2005/0063700 A1* | 3/2005 | Shin | H04B 10/0775 398/30 |
| 2005/0195807 A1* | 9/2005 | Rao | H04J 3/14 370/386 |
| 2006/0056842 A1* | 3/2006 | Li | H04J 14/0227 398/12 |
| 2011/0008049 A1* | 1/2011 | Tanonaka | H04J 14/0291 398/79 |
| 2013/0114416 A1* | 5/2013 | Rao | H04L 43/10 370/241 |
| 2013/0121685 A1 | 5/2013 | Rao et al. | |
| 2014/0241712 A1* | 8/2014 | Sugawara | G02B 6/02042 398/5 |
| 2015/0304743 A1* | 10/2015 | Carpini | H04Q 11/0062 398/31 |

OTHER PUBLICATIONS

ITU-T Recommendation G.872, "Architecture of optical transport networks", Nov. 2001.
ITU-T Recommendation G.805, "Generic functional architecture of transport networks", Mar. 2000.
ITU-T Recommendation G.694.1, "Spectral grids for WDM applications: DWDM frequency grid", Jun. 2002.
Telecordia's Generic Requirements GR-253, "Synchronous Optical Network (SONET) Transport Systems: Common Generic Criteria," Issue 4, Dec. 2005.
Mannie, E., "Generalized Multi-Protocol Label Switching (GMPLS) Architecture", RFC 3945, The Internet Society, Oct. 2004.
ITU-T G.873.1, Series G: Transmission Systems and Media, Digital Systems and Networks, Digital networks—Optical transport networks Optical Transport Network (OTN): Linear Protection, Mar. 2003.
RFC 4872, "RSVP-TE Extensions for E2E GMPLS Recovery" May 2007.

* cited by examiner

METHODS AND SYSTEMS FOR RECOVERY IN COHERENT OPTICAL NETWORKS

CROSS-REFERENCE TO RELATED APPLICATIONS

The present patent application claims priority to the provisional patent application identified by U.S. Ser. No. 62/088,081 titled "Recovery in coherent optical networks" filed on Dec. 5, 2014, the entire content of which is hereby incorporated herein by reference. The present patent application references the patent application identified by U.S. Ser. No. 13/452,413, titled "OPTICAL LAYER STATUS EXCHANGE OVER OSC—OAM METHOD FOR ROADM NETWORKS" filed on Apr. 20, 2012, the entire content of which is hereby incorporated herein by reference.

FIELD OF THE DISCLOSURE

The disclosure generally relates to methods and apparatuses for recovery in coherent optical transport networks (OTN) using Operation, Administration & Maintenance (OAM) data at the optical layer. More particularly the disclosure relates to use of OAM data transmitted at the optical level for status and failure management in coherent OTNs.

BACKGROUND

An Optical Transport Network (OTN) is comprised of a plurality of switch nodes linked together to form a network. The OTN includes a data layer, a digital layer, and an optical layer. The optical layer contains multiple sub-layers. OTN structure, architecture, and modeling are further described in the International Telecommunication Union recommendations, including ITU-T G.709, ITU-T G.872, and ITU-T G.805, which are well known in the art. In general, the OTN is a combination of the benefits of SONET/SDH technology and dense wavelength-division multiplexing (DWDM) technology (optics).

The construction and operation of switch nodes (also referred to as "nodes") in the OTN is well known in the art. In general, the nodes of an OTN are generally provided with a control module, input interface(s) and output interface(s). The control modules of the nodes in the OTN function together to aid in the control and management of the OTN. The control modules can run a variety of protocols for conducting the control and management (i.e. Operation, Administration and Maintenance—referred to as OAM) of the OTN. One prominent protocol is referred to in the art as Generalized Multiprotocol Label Switching (GMPLS).

Generalized Multiprotocol Label Switching (GMPLS) is a type of protocol which extends multiprotocol label switching (MLS) to encompass network schemes based upon time-division multiplexing (e.g. SONET/SDH, PDH, G.709), wavelength multiplexing, and spatial switching (e.g. incoming port or fiber to outgoing port or fiber). Multiplexing is when two or more signals or bit streams are transferred over a common channel.

Wave-division multiplexing is a type of multiplexing in which two or more optical carrier signals are multiplexed onto a single optical fiber by using different wavelengths (that is, colors) of laser light.

Generalized Multiprotocol Label Switching (GMPLS) includes multiple types of label switched paths including protection and recovery mechanisms which specify (1) working connections within a network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tailend node or end node or destination node. The headend node or tailend node initially selects to receive data over the working connection (such as an optical channel data unit label switched path) and, if a working connection fails, the headend node or tailend node may select a protecting connection for passing data within the network. The set up and activation of the protecting connections may be referred to as restoration or protection.

Lightpaths are optical connections carried over a wavelength, end to end, from a source node to a destination node in an optical transport network (OTN). Typically, the lightpaths pass through intermediate links and intermediate nodes in the OTN. At the intermediate nodes, the lightpaths may be routed and switched from one intermediate link to another intermediate link. In some cases, lightpaths may be converted from one wavelength to another wavelength at the intermediate nodes.

As previously mentioned, optical transport networks (OTN) have multiple layers including a data packet layer, a digital layer, and an optical layer (also referred to as a photonic layer). The data and digital layers include an optical channel transport unit (OTU) sub-layer and an optical channel data unit (ODU) sub-layer. The optical layer has multiple sub-layers, including the Optical Channel (OCh) layer, the Optical Multiplex Section (OMS) layer, and the Optical Transmission Section (OTS) layer. The optical layer provides optical connections, also referred to as optical channels or lightpaths, to other layers, such as the electronic layer. The optical layer performs multiple functions, such as monitoring network performance, multiplexing wavelengths, and switching and routing wavelengths. The Optical Channel (OCh) layer manages end-to-end routing of the lightpaths through the optical transport network (OTN). The Optical Multiplex Section (OMS) layer network provides the transport of optical channels through an optical multiplex section trail between access points. The Optical Transmission Section (OTS) layer network provides for the transport of an optical multiplex section through an optical transmission section trail between access points. The OCh layer, the OMS layer, and the OTS layer have overhead which may be used for management purposes. The overhead may be transported in an Optical Supervisory Channel (OSC).

The Optical Supervisory Channel (OSC) is an additional wavelength that is adapted to carry information about the network and may be used for management functions. The OSC is carried on a different wavelength than wavelengths carrying actual data traffic and is an out-of-band channel. Typically, the OSC is used hop-by-hop and is terminated and restarted at every node.

The International Telecommunications Union (ITU) recommendation ITU-T G.709 further defines the OTS, OMS and OCh layers and recommends use of the OSC to carry overhead corresponding to the layers. Additionally, ITU-T recommendation G.872 specifies defects for the OTS, OMS, and OCh layers as well as specifying Operation, Administration & Maintenance (OAM) requirements.

ITU-T recommendations suggest that the OSC utilize a Synchronous Transport Signal (STS) Optical Carrier transmission rate OC-3. Optical Carrier transmission rates are a standardized set of specifications of transmission bandwidth for digital signals that can be carried on fiber optic networks. The OC-3 frame contains three column-interleaved STS Level 1 (STS-1) frames; therefore, the line overhead consists of an array of six rows by nine columns (that is, bytes). The OC-3 frame format is further defined in Telecordia's Generic Requirements GR-253, "Synchronous Optical Network Common Generic Criteria," Issue 4. The OC-3 frame format contains a transport overhead portion. Within the transport overhead portion, bytes designated as D4, D5, D6, D7, D8, D9, D10, D11, and D12 are defined by GR-253 for use by Data Communication Channel (DCC).

The patent application identified by U.S. Ser. No. 13/452, 413, titled "OPTICAL LAYER STATUS EXCHANGE OVER OSC—OAM METHOD FOR ROADM NETWORKS" filed on Apr. 20, 2012, discloses methods for supporting OAM functions for the optical layers, for example, for carrying defect information and overhead in the OSC. The application discloses methodology and apparatuses for supporting OAM functions such as continuity, connectivity, and signal quality supervision for optical layers. The methodology discloses mapping optical layer overhead OAM information to specific overhead bits and assigning the overhead bits to specific OSC overhead bytes. This provides reliable exchange of overhead bytes over OSC between nodes.

However, current systems and publications do not disclose mechanisms for optical layer recovery (e.g. protection and/or restoration). Current protocols define mechanisms for supporting protection in digital layers (SDH, OTN Networks) such as GR-253 and G.873.1; however, optical nodes may not have access to the digital layer. Further, there are no protocols for supporting protection functions in optical layers (OMS & OCh layers).

Additionally, current systems and protocols have at least the following limitations at the optical layer: no bi-directional switchover (which may be necessary in latency sensitive applications), no support for reversions, GMPLS restorations are not possible in some failure scenarios, avoiding protection or restoration when there is client signal failures is not possible, and path monitoring schemes do not work in coherent networks unless additional and expensive hardware is deployed.

For example, in current systems there is no bi-directional switchover. Therefore, a failure in a uni-directional fiber carrying optical data traffic from a headend node to a tailend node would be detected by the tailend node, since the tailend node would detect the lack of received optical data traffic, but not by the headend node transmitting the optical data traffic signals. The tailend node would switch to selecting received optical data traffic from a protection path, but the headend node would continue to select received data traffic from the working path. This can result in errors in latency sensitive applications.

The present disclosure addresses these deficiencies utilizing OAM data transmitted at the optical level for status and failure management at the optical layer in coherent OTNs.

SUMMARY

Method and nodes are disclosed. The problems caused by the lack of mechanisms for optical layer-based recovery are addressed by utilizing mapped optical layer overhead OAM information in the OSC to implement recovery mechanisms to manage status information and failures in coherent OTNs at the optical layer.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
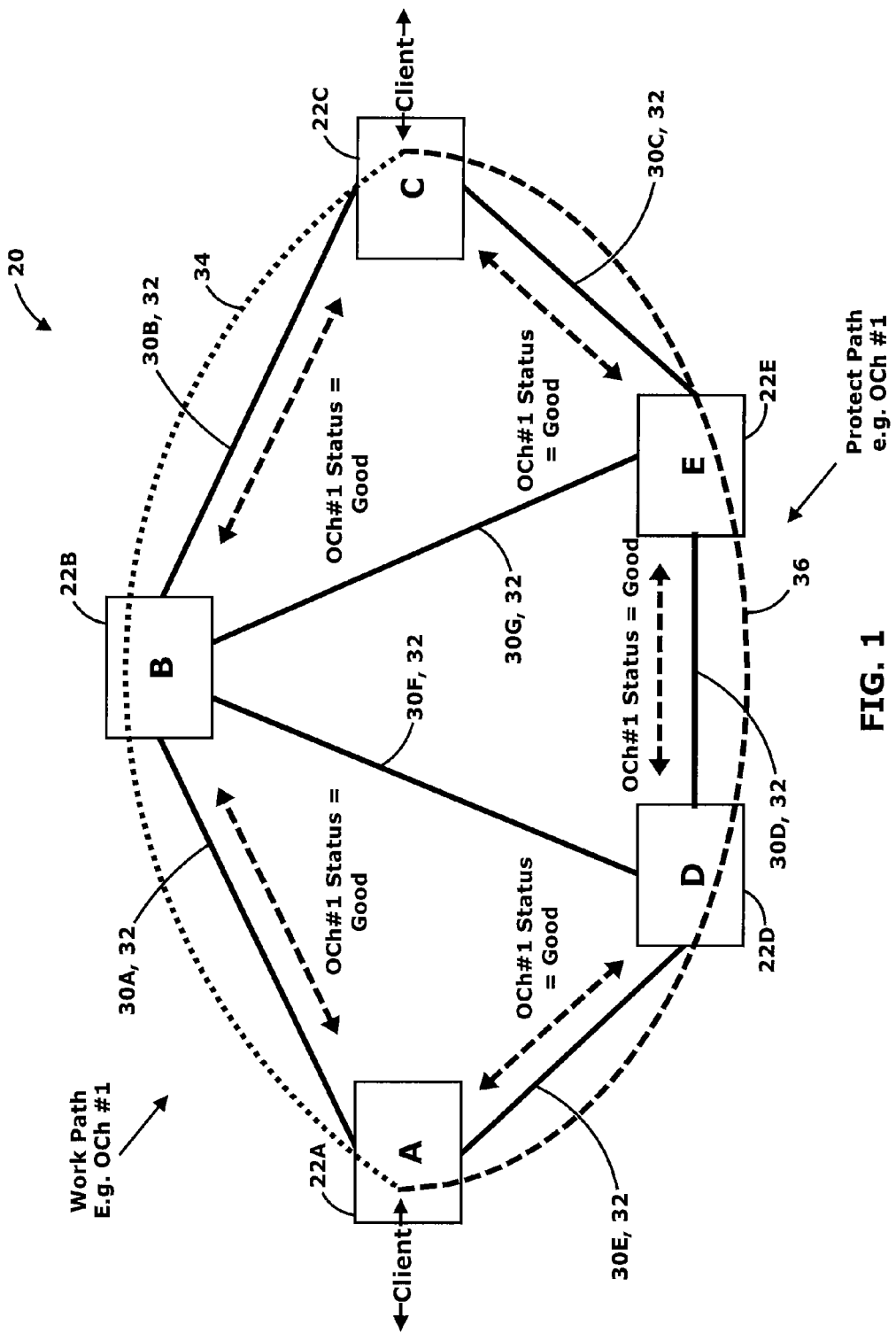
FIG. 1 is an illustration of an exemplary optical transport network.

The following detailed description refers to the accompanying drawings. The same reference numbers in different drawings may identify the same or similar elements.

The mechanisms proposed in this disclosure circumvent the problems caused by the lack of mechanisms for optical layer recovery. The present disclosure describes methods and apparatuses utilizing mapped optical layer overhead OAM information in the OSC to implement recovery mechanisms to manage status information and failures in coherent OTNs at the optical layer.

DEFINITIONS

If used throughout the description and the drawings, the following short terms have the following meanings unless otherwise stated:

BDI stands for Backward Defect Indication. A single-bit BDI field, for example, can convey, towards the source, a signal fail status detected in a tandem connection termination sink function. BDI-P stands for Backward Defect Indication for Payload signal fail status. BDI-O stands for Backward Defect Indication for Overhead signal fail status.

DWDM stands for dense wavelength division multiplexing. DWDM multiplexes multiple optical carrier signals, such as Optical Channel (OCh) signals or Super Channel (SCh) signals, onto a single optical fiber by using different laser light wavelengths (colors).

FDI stands for Forward Defect Indication. FDI-P stands for Forward Defect Indication for Payload signal fail status. FDI-O stands for Forward Defect Indication for Overhead signal fail status.

FEC stands for forward error correction.

FPGA stands for field programmable gate array. FPGAs can be programmed after deployment in a system.

FRU stands for field replaceable unit.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

LOS stands for Loss of Signal.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance. Examples of OAM functions include continuity, connectivity and signal quality supervision.

OADM stands for optical add/drop multiplexer. ROADM stands for reconfigurable optical add/drop multiplexer. Network operators can remotely reconfigure the multiplexer by sending soft commands with a ROADM.

OC stands for optical carrier. Optical carrier transmission rates are a standardized set of specifications of transmission bandwidths for digital signals that can be carried on fiber optic networks.

OCh stands for Optical Channel layer.

OLT stands for Optical Line Terminal.

OMS stands for Optical Multiplex Section layer.

OSC stands for Optical Supervisory Channel.

OTN stands for Optical Transport Network which includes a set of optical switch nodes which are connected by optical fiber links. ITU-T recommendations G.709 and G.872 define OTN interface requirements and network architecture respectively.

OTS stands for Optical Transmission Section layer.

SCh stands for Super Channel. A Super-Channel (SCh) is a collection of one or more frequency slots to be treated as a unified entity for management and control plane purposes. A Frequency Slot is a range of frequency allocated to a given channel and unavailable to other channels within the same flexible grid. A frequency slot is a contiguous portion of the spectrum available for an optical passband filter. A frequency slot is defined by its nominal central frequency and its slot width. A frequency slot is further defined in the International Telecommunications Union Recommendation ITU-T G.694.1, "Spectral grids for WDM applications: DWDM frequency grid". A contiguous spectrum Super-Channel is a Super-Channel with a single frequency slot. A split-spectrum Super-Channel is a Super-Channel with multiple frequency slots.

SF stands for Signal Failure.

SONET/SDH stands for Synchronous Optical Networking/Synchronous Digital Hierarchy which are standardized multiplexer protocols that transfer multiple digital bit streams over optical fiber using lasers or light emitting diodes.

STS stands for Synchronous Transport Signal. STS-1 stands for Synchronous Transport Signal—Level 1.

TCM stand for Tandem Connection Monitoring.

TTI stands for Trail Trace Identifier. An exemplary TTI for optical transport networks is defined in ITU G.709.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent.

The use of the term "at least one" or "one or more" will be understood to include one as well as any quantity more than one, including but not limited to, 1, 2, 3, 4, 5, 10, 15, 20, 30, 40, 50, 100, etc. The term "at least one" or "one or more" may extend up to 100 or 1000 or more depending on the term to which it is attached. In addition, the quantities of 100/1000 are not to be considered limiting, as lower or higher limits may also produce satisfactory results.

In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example.

In accordance with the present disclosure, messages transmitted between nodes can be processed by circuitry within the input interface(s), and/or the output interface(s) and/or the node controller. Circuitry could be analog and/or digital, components, or one or more suitably programmed microprocessors and associated hardware and software, or hardwired logic. Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations. Additionally, it should be understood that the node can be implemented in a variety of manners as is well known in the art.

An exemplary optical transport network (OTN) 20 is shown in FIG. 1, by way of example. FIG. 1 illustrates a channel status flow for a service in channel protection. The optical transport network 20 includes optical switch nodes 22A-22n (hereinafter referred to as "nodes" or "optical nodes" or "photonic nodes"). The optical transport network 20 may include any number of optical nodes 22A-22n. For exemplary purposes, the optical transport network 20 of FIG. 1 includes five optical nodes 22A-22E. The optical transport network 20 may be configured in any topology, for example, linear, ring, or mesh.

A headend node and a tailend node may be denoted for a particular path in accordance to the path setup direction. In this example, optical node 22A functions as a headend node (also known as a source node); while optical node 22C functions as a tailend node (also known as a destination node). Other optical nodes 22 between the headend node 22A and tailend node 22C in a particular path are known as intermediate nodes. In this example, the optical nodes 22B, 22D, and 22E act as intermediate nodes. In between the optical nodes 22A-22n are communication links 30A-30m. For purposes of simplicity of explanation, links 30A-30G are illustrated in FIG. 1, but it will be understood that there may be more or fewer links 30.

The optical nodes 22A-22n are adapted to facilitate the communication of data traffic (which may be referred to herein as "traffic" and/or "data") between optical nodes 22A-22n in the optical transport network 20 over communication links 30A-30m, as well as into and out of the optical transport network 20. Control information is also sent and received by optical nodes 22A-22n over communication links 30A-30m. The control information may be carried via an Optical Supervisory Channel (OSC) 32 through the communication links 30A-30m. As previously described, the OSC 32 is an additional wavelength that is adapted to carry information about the optical transport network 20 and may be used for management functions. The OSC 32 is carried on a different wavelength than wavelengths carrying actual data traffic and is an out-of-band channel. Typically, the OSC 32 is used hop-by-hop and is terminated and restarted at every node.

The communication links 30 can be implemented in a variety of ways, such as a physical link including electrical (e.g., copper wire or coax) and/or optical signal (e.g., optical fiber or other waveguide) carrying capabilities, or as a wireless link. The communication links 30 can be fiber optic cables, electronics cables, wireless communication links, or the like.

Data traffic and control information may follow one or more paths through the optical transport network 20. A working path 34 (for example, OCh #1) may be established by one or more optical nodes 22A-22n, or by a controller (not shown) separate from the optical nodes 22A-22n and/or separate from the optical transport network 20. In the example shown in FIG. 1, the working path 34 is established between headend node 22A and tailend node 22C through intermediate node 22B. The working path 34 initially carries data traffic and control information, and continues to carry data traffic and control information while there is no failure on the working path 34.

A protection path 36 (for example, OCh #1) may also be established to carry data traffic and control information. The headend node 22A and the tailend node 22C may select data traffic from the protection path 36 if there is a failure on the working path 34. In FIG. 1, the protection path 36 is illustrated between headend node 22A and tailend node 22C through intermediate nodes 22D and 22E.

The working path 34 and the protection path 36 can be established by one or more nodes 22A-22n, such as headend node 22A, prior to any failure in the optical transport network 20, as illustrated in FIG. 1. Additionally, or alternately, one or more protection path 36 may be established after a failure in the optical transport network 20 (see FIGS. 9-10). The working path 34 and the protection path 36 may be established, for example, by using GMPLS protocols. The working path 34 and the protection path 36 may be bi-directional or co-routed.

In general, the term "dedicated protection," as used herein, refers to a situation in which the headend node 22A or tailend node 22C sets up a dedicated protection path 36 for a particular working path 34, as illustrated in FIG. 1, in case of failure of the working path 34, before failure of the working path 34. A type of dedicated protection in accordance with an embodiment of the present disclosure is known in the art as "1+1 Protection." In dedicated protection, the data traffic is simultaneously transmitted from the headend node 22A (and/or tailend node 22C) on both the working path 34 and protection path 36. Dedicated protection may be used with unidirectional and bidirectional protection, as described in RFC 4872, "RSVP-TE Extensions for E2E GMPLS Recovery" (May 2007).

Figure 2:
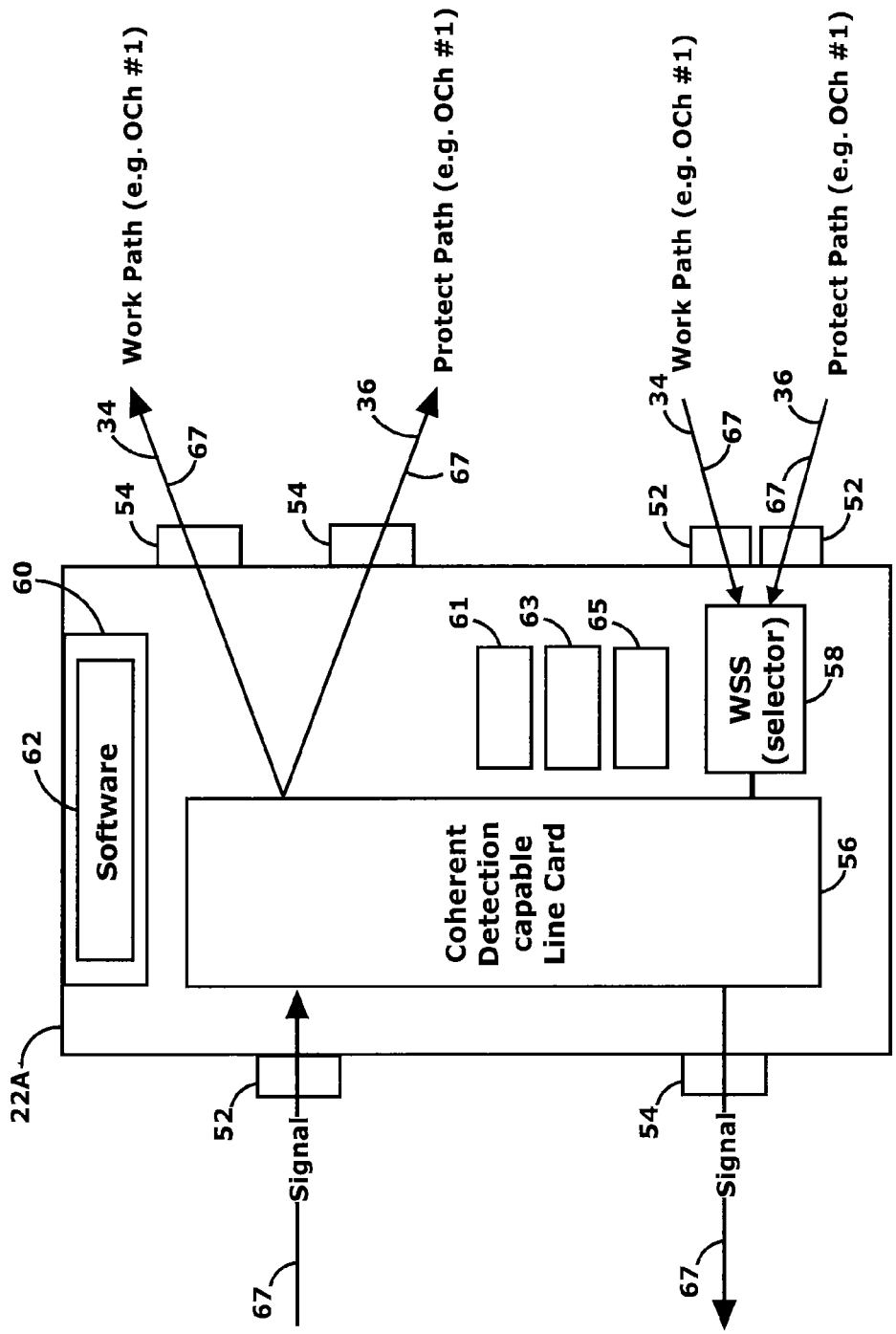
FIG. 2 is block diagram of an aspect of an exemplary optical node in accordance with the present disclosure.
Figure 3:
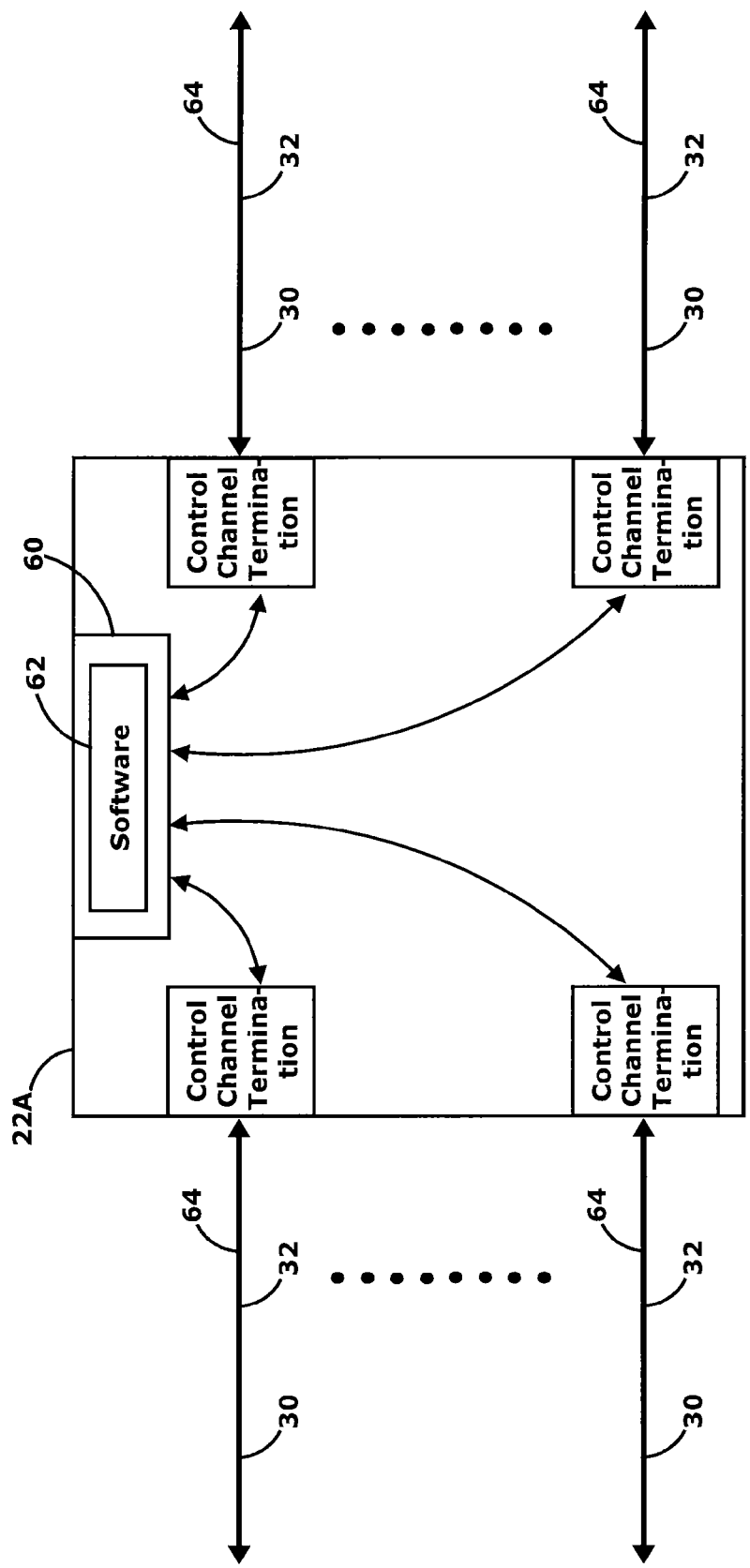
FIG. 3 is block diagram of another aspect of the exemplary node of FIG. 2.

Referring to FIGS. 2 and 3, shown therein are block diagrams of aspects of an exemplary optical node 22A constructed in accordance with the present disclosure. In general, the optical nodes 22A-22n transmit and receive data traffic and control signals.

The optical nodes 22A-22n can be implemented in a variety of ways. Nonexclusive examples include optical line terminals (OLTs), optical crossconnects (OXCs), optical line amplifiers, optical add/drop multiplexer (OADMs) and/or reconfigurable optical add/drop multiplexers (ROADMs), interconnected by way of intermediate links. OLTs may be used at either end of a connection or intermediate link.

OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

As shown in FIG. 2, the exemplary optical node 22A is provided with one or more input interfaces 52, one or more output interfaces 54, and circuitry such as one or more line card 56, one or more switch 58, and one or more control module 60. The node 22A may also include non-transitory memory (not shown), either within the control module 60 and/or the switch 58, or separate from the control module 60 and/or the switch 58. As is well known to one having skill in the art, the optical node 22A may include other components, nonexclusive examples of which include one or more multiplex card 61, one or more demultiplex card 63, and/or one or more amplifier card 65.

In general, the control module 60 serves to control the operations of the optical node 22A. The control module 60 may have software 62 installed on the control module 60. In some implementations, the control module 60 and/or software 62 controlling the operations of the optical node 22A may be located separately from the optical node 22A. In one implementation, the software 62 may be network control software.

In general, the line card 56 receives and transmits data traffic signals 67 indicative of data traffic. The line card 56 is capable of coherent detection. The line card 56 may have firmware installed on the line card 56, as is well known to those having skill in the art. Nonexclusive examples of line card 56 include Field Programmable Gate Arrays and ASICs. The line card 56 may monitor health of the data traffic received by the optical node 22A.

The switch 58, also referred to as a selector, may be a Wavelength Selective Switch (WSS). When the node 22A receives data traffic, the switch 58 is used to select data traffic from either the working path 34 or the protection path 36 based on the status of the optical layer, as detected from the data path and the control path in accordance with the present disclosure, as will be further described herein. The switch 58 is in communication with the line card 56 and the control module 60.

The input interface(s) 52 and the output interface(s) 54 of the optical node 22A are adapted to communicate with corresponding input interface(s) 52, and output interface(s) 54 of one or more other node 22B-22n within the optical transport network 20 via communication links 30, as shown in FIG. 1. An example of an input interface 52 and/or an output interface 54 is an Ethernet card or optical port. In general, each of the input interface(s) 52 and/or the output interface(s) 54 may have a unique logical identification, such as an IP address.

The implementation of the input interface(s) 52, and the output interface(s) 54 will depend upon the particular type of communication link 30 that the particular input interface 52 and/or output interface 54 is designed to communicate with. For example, one of the input interfaces 52 can be designed to communicate wirelessly with another optical node 22 within the optical transport network 20, while one of the output interfaces 54 of the node 22 can be designed to communicate optically through a fiber-optic link. For a particular node 22, multiple input interfaces 52 can be of the same type or different types; multiple output interfaces 54 can be of the same type or different types; and the input interface(s) 52 and output interface(s) 54 can be of the same type or different types.

The input interface 52 and the output interface 54 are shown separately for purposes of clarity. However, it should be understood that one or more of the input interfaces 52 and/or the output interfaces 54 could be connected to a single communication link 30 and implemented as a single device, such as a line module.

The components of the optical node 22 may be implemented as separate devices, which may have their own power supply, local memory, and processing equipment. In another example, the optical node 22 can be implemented as a single device having a shared power supply, memory and processing equipment. Or, in another example, the node 22 can be implemented in a modular manner in which one or more components share a power supply and/or housing.

As illustrated in FIG. 3, the exemplary optical node 22A, may receive one or more optical control signal 64, from one or more other optical nodes 22B-22n in the optical transport network 20, containing information regarding the Operation, Administration, and/or Maintenance (OAM) of optical layers in the optical transport network 20. The optical control signal 64 may be carried via the Optical Supervisory Channel (OSC) 32, or any suitable optical control channel. The optical layer OAM information, such as status and defect information, is mapped to specific bits in OSC 32. The OAM information communicated for a given data signal may be based at least in part on the health of the hardware in the path of the data signal and the health of the optical data path itself. Methods and systems for transmitting and receiving OAM data within the OSC 32 are more fully described in the patent application identified by U.S. Ser. No. 13/452,413, titled "OPTICAL LAYER STATUS EXCHANGE OVER OSC—OAM METHOD FOR ROADM NETWORKS" filed on Apr. 20, 2012.

In general, the optical control signal 64 is terminated at the optical node 22A, as illustrated in FIG. 3, where the control module 60 extracts the optical layer overhead OAM information from the optical control signal 64 in the OSC 32. The optical node 22A may notify software 62 in the optical node 22A and/or may notify other optical nodes 22B-22n in the optical transport network 20 of the status of the optical layer, as indicated by the overhead information. In one embodiment, the optical node 22A inspects the optical control signal 64 for stable values before notifying the software 62 of the status of the optical layer. The filtering for stable values may be done in hardware, in which case, the association of filtering characteristics to fields may be fixed in the hardware code, for example, in a FPGA's code. Also, if granular notifications (interrupts) are provided to the software 62, the association of fields to interrupt bits may be fixed in the hardware code.

Additionally, the optical node 22A may write, with the software or with hardware, Operation, Administration, and/or Maintenance (OAM) information of the optical layers in the optical transport network 20 into overhead of the optical control signal 64 to be transmitted from the optical node 22A via the OSC 32. This information may include, for example, equipment status, incoming signal status, and/or connectivity information. Of course, the information may include any OAM information. The optical node 22A may then initiate, with the software, transmission of the optical control signal 64 via the Optical Supervisory Channel (OSC) 32, or any suitable optical channel.

The optical supervisory channel 32 (OSC) may utilize a Synchronous Transport Signal (STS) Optical Carrier transmission rate OC-3. Alternatively, the OSC 32 may utilize a concatenated Optical Carrier transmission rate OC-3c. Alternately, the OSC 32 may utilize an Optical Carrier transmission rate OC-N, such as OC-3, OC-12, OC-48, OC-192, or OC-768, or any suitable OC-N. Optical Carrier transmission rates are a standardized set of specifications of transmission bandwidth for digital signals that can be carried on fiber optic networks. OC-3 can have an optical carrier transmission rate of up to 155.52 megabits per second. Bytes within the OC-3 can be designated to carry OAM overhead for the optical layers in the optical transport network 20. OAM information for the optical layers, OTS, OMS, and OCh/Super Channel, may be assigned to defined overhead fields with a defined number of bits. The overhead fields and bits may be assigned to defined bytes in the STS-1 frames of the OC-N. This method is further described in the patent application identified by U.S. Ser. No. 13/452,413, titled "OPTICAL LAYER STATUS EXCHANGE OVER OSC—OAM METHOD FOR ROADM NETWORKS" filed on Apr. 20, 2012.

Access to the OC-3 overhead bytes in the OSC 32 is provided for each fiber direction supported by the optical node 22A. As illustrated in FIG. 3, for example, in a typical node 22A, the number of fiber directions may be 1, 2, 3 4, 5, 6, 7, 8, or 9, directions. The status of individual channels transmitted on the fiber is dependent on one or more factors, nonexclusive examples of which include signal strength of the incoming signal, the health of the hardware, and connectivity information (provisional and physical). The optical node 22A inspects the overhead bytes in the OSC 32 and may look for stable values before notifying the software 62 of the status of the incoming data traffic.

Figure 4:
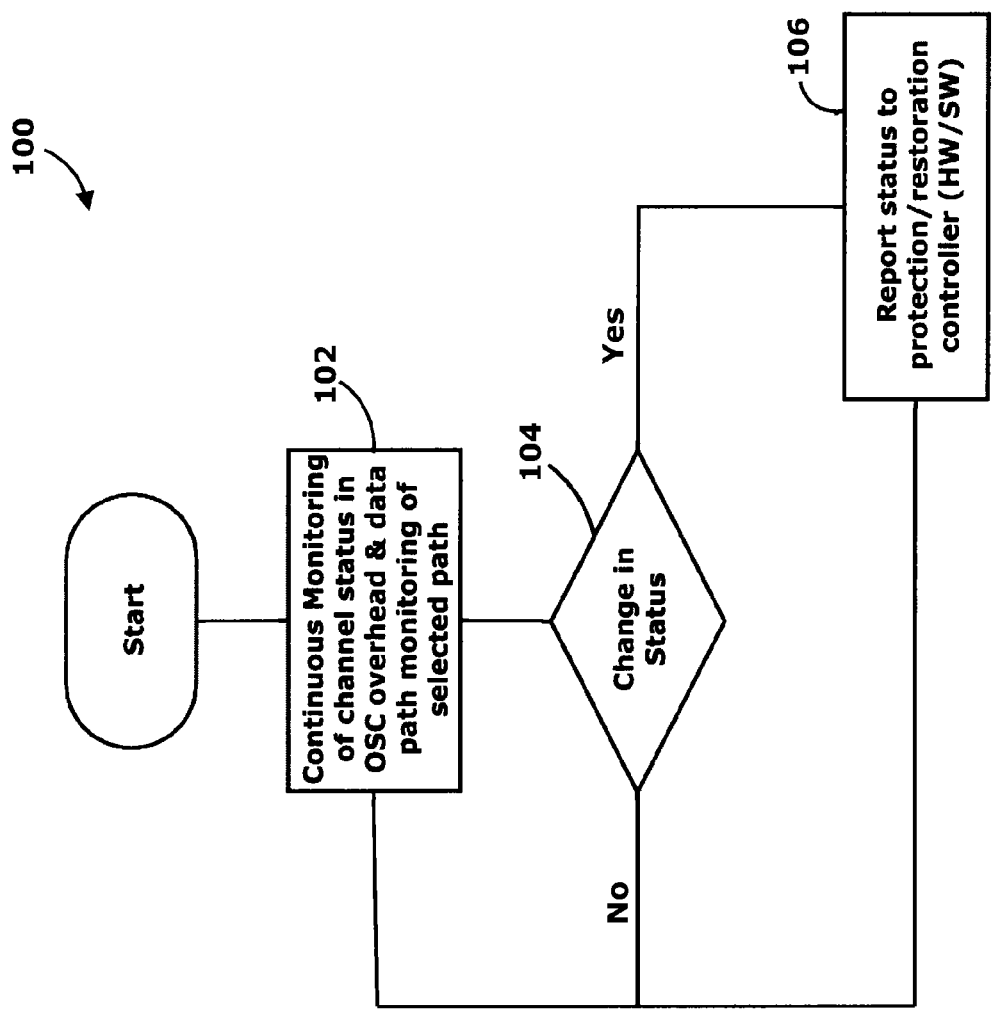
FIG. 4 is a flow diagram an exemplary monitoring and reporting process 100 in accordance with the present disclosure.

FIG. 4 illustrates a flow diagram of a monitoring and reporting process 100 in accordance with the present disclosure. In process 100, in step 102, an exemplary optical node 22A in accordance with the present disclosure continuously monitors the status of the optical transport network 20 by monitoring the overhead transmitted in the optical control signal 64 in the OSC 32 and monitoring the data traffic of the working path 34 and the protection path 36. The optical node 22A reports the status, in step 106, to the control module 60, and/or software 62, and/or components or circuitry. The status may also be reported to hardware, for example a FPGA or ASIC. In decision step 104, the optical node 22A determines if there is a change in the status of the optical transport network 20. If there is no change, the optical node 22A continues monitoring the status and reports the status in step 106, as previously described. If there is a change in status, the optical node 22A reports the status in step 106, as previously described.

Figure 5:
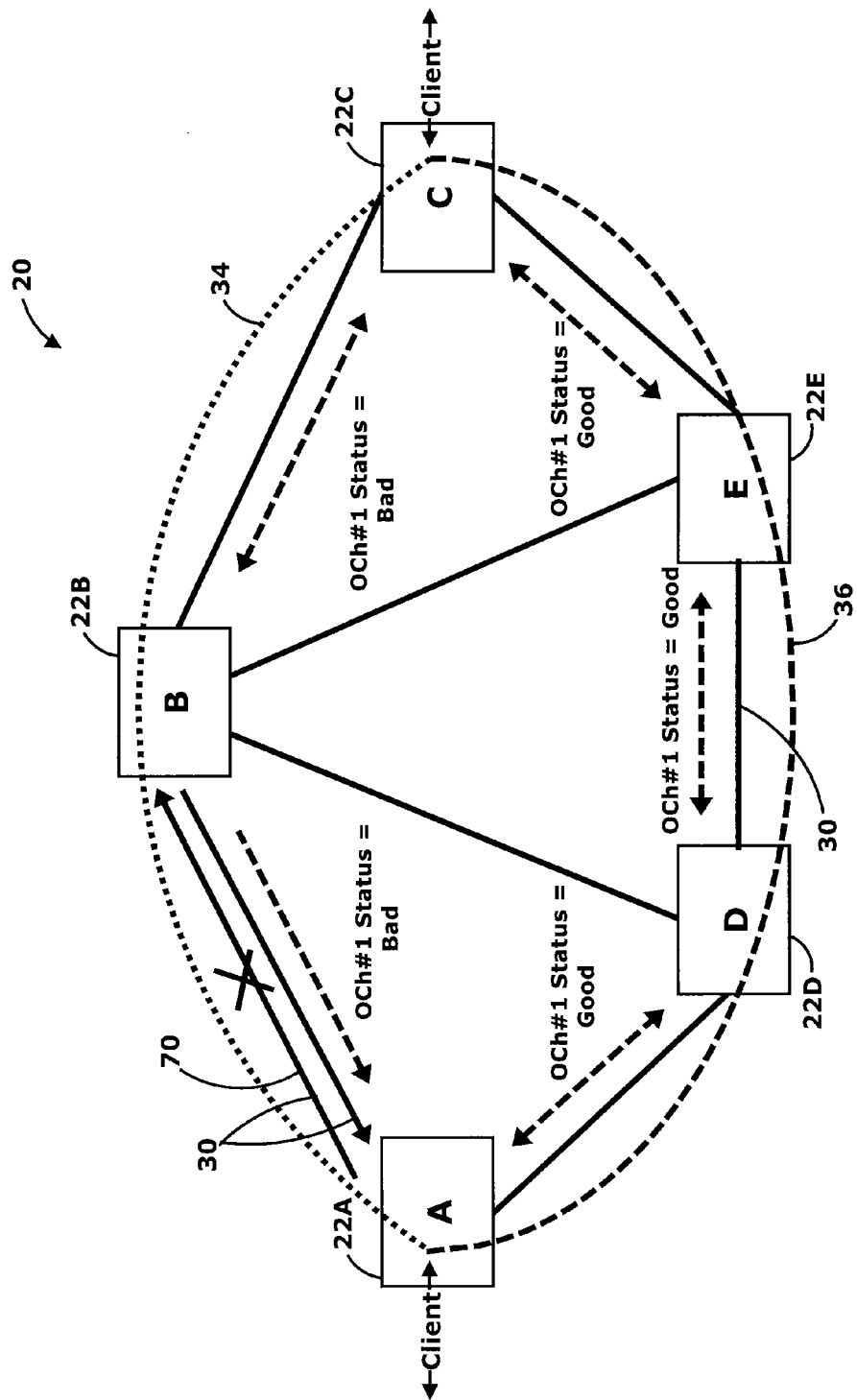
FIG. 5 is an illustration of a failure in the exemplary optical transport network of FIG. 1.

Turning now to FIG. 5, shown therein is the exemplary optical transport network 20 of FIG. 1, in which a failure, designated by "X", has occurred in the working path 34. In this example, the failure "X" is the failure of a uni-directional fiber 70 in communication link 30 between optical node 22A and optical node 22B. Each node 22A-22n is capable of detecting failures and providing status updates to both downstream nodes 22 and upstream nodes 22 over the control path OSC 32. For example, the optical nodes 22A, 22B, and 22C in the working path 34 are monitoring the overhead in the OSC 32. The OSC 32 terminates at the optical nodes 22A, 22B, and 22C, and the OAM information is extracted from the OSC 32, as previously described. The optical nodes 22A, 22B, and 22C are also monitoring the data traffic in the working path 34 and/or protection path 36, such as with the firmware in the line cards 56, and/or other circuitry, such as the one or more multiplex card 61, one or more demultiplex card 63, and/or one or more amplifier card 65. Node 22B detects uni-directional failure "X" and provides status information using the overhead bits in the OSC 32 to the headend node 22A as well as to the tailend node 22C.

Upon detection in the monitored OAM information from the OSC 32, and/or upon detection in the monitored data traffic, of the failure "X" in working path 34, the headend node 22A and tailend node 22C, may switch to the protection path 36 as the provider of the data traffic, using switches 58. The switch to the protection path 36 may be carried out by software 62 on the control module 60 or by hardware, for example a FPGA or ASIC.

Because the headend node 22A and the tailend node 22C are both monitoring the OAM information from the OSC 32, the headend node 22A and the tailend node 22C may both detect the failure "X". Additionally, the intermediate node 22B may detect the failure and notify the headend node 22A and the tailend node 22C. Therefore, both the headend node 22A and the tailend node 22C may switch to the same path, such as protection path 36, irrespective of the uni-directional nature or bi-directional nature of the failure "X".

Figure 6:
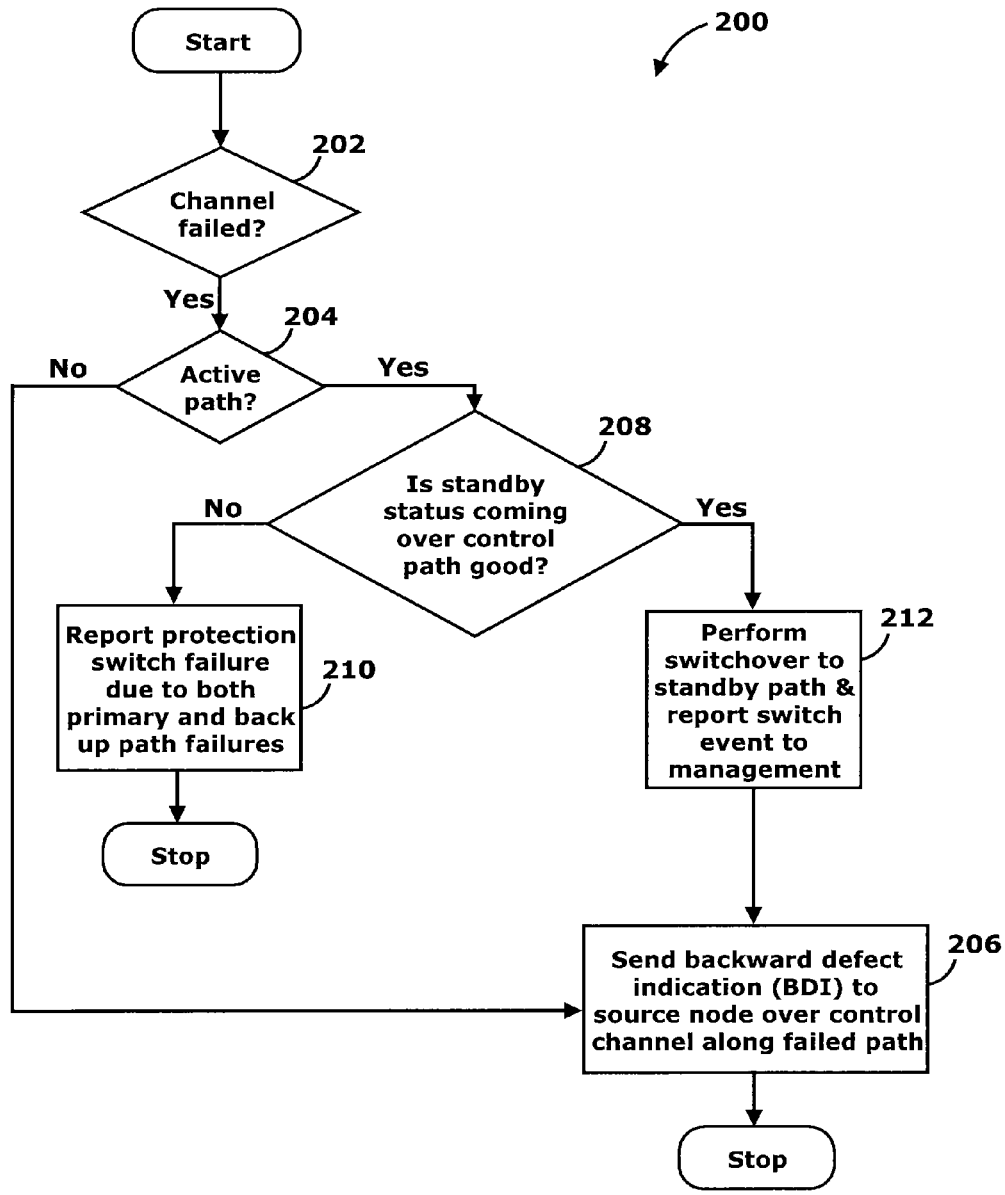
FIG. 6 is a flow diagram of an exemplary protection process in accordance with the present disclosure.

FIG. 6 is a flow diagram of an exemplary protection process 200 in accordance with the present disclosure. In this embodiment, in step 202, the optical node, such as optical node 22B and/or 22C, for example, has detected a uni-directional or bi-directional failure in the optical transport network 20, by monitoring the OAM information from the OSC 32 as well as status information from the line card 56, and/or other circuitry, such as the one or more multiplex card 61, one or more demultiplex card 63, and/or one or more amplifier card 65, as previously described. In step 204, the optical node 22B determines whether or not the failure is in the working path 34. In step 206, if the failure is in a path other than the working path 34, the optical node 22B and/or 22C may send a Backward Defect Indication (BDI) to the headend node 22A over the optical control channel in the overhead of the OSC 32, indicating the failure details.

If the failure is in the working path 34, in step 208, the tailend node 22C may then determine, by monitoring the OAM information from the OSC 32 as well as status information from the circuitry (such as line card 56, and/or other circuitry, such as the one or more multiplex card 61, one or more demultiplex card 63, and/or one or more amplifier card 65), whether or not the protection path 36 has a good status, that is, whether or not there is a failure in the protection path 36. If the status of the protection path 36 is bad, that is, if a failure is detected in the protection path 36, the tailend node 22C will not switch to the protection path 36 as the provider of the data traffic. The tailend node 22C may, in step 210, report the failure to switch to the protection path 36.

As shown in step 212, if the status of the protection path 36 is good, that is, if no failure is detected in the protection path 36, the switch 58 in the tailend node 22C will switch to the protection path 36 as the provider of the data traffic. The control module 60 of the tailend node 22C may report the switch to the protection path 36 to the other optical nodes 22A, 22B, 22D-22n, the optical transport network 20, software 62, and/or a network controller (not shown). The headend node 22A will switch to the protection path 36 as the provider of the data traffic.

Next, once again in step 206, the optical node 22B and/or 22C may send a Backward Defect Indication (BDI) regarding the working path 34 to the source node 22A of the path over the optical control channel in the overhead of the OSC 32.

In the case of a bi-directional failure, both the headend node 22A and the tailend node 22C detect the failure of the working path 34 and switch to the protection path 36 as the provider of the data traffic. In the case of uni-directional failure "X", as shown in the example, one of the headend node 22A and the tailend node 22C detects the failure of the working path 34, whereas the other receives Backward Defect Indication (BDI) from the one detecting the uni-directional failure "X", and both the headend node 22A and the tailend node 22C switch to the protection path 36 as the provider of the data traffic. The BDI is sent over the optical control channel in the overhead of the OSC 32. Additionally, intermediate node 22B in the working path 34 may detect the uni-directional failure "X" in the working path 34, using the OAM information from the OSC 32 as well as status information from the line card 56, and notify the headend node 22A and/or the tailend node 22C of the uni-directional failure "X" in the working path 34, over the optical control channel in the overhead of the OSC 32.

Figure 7:
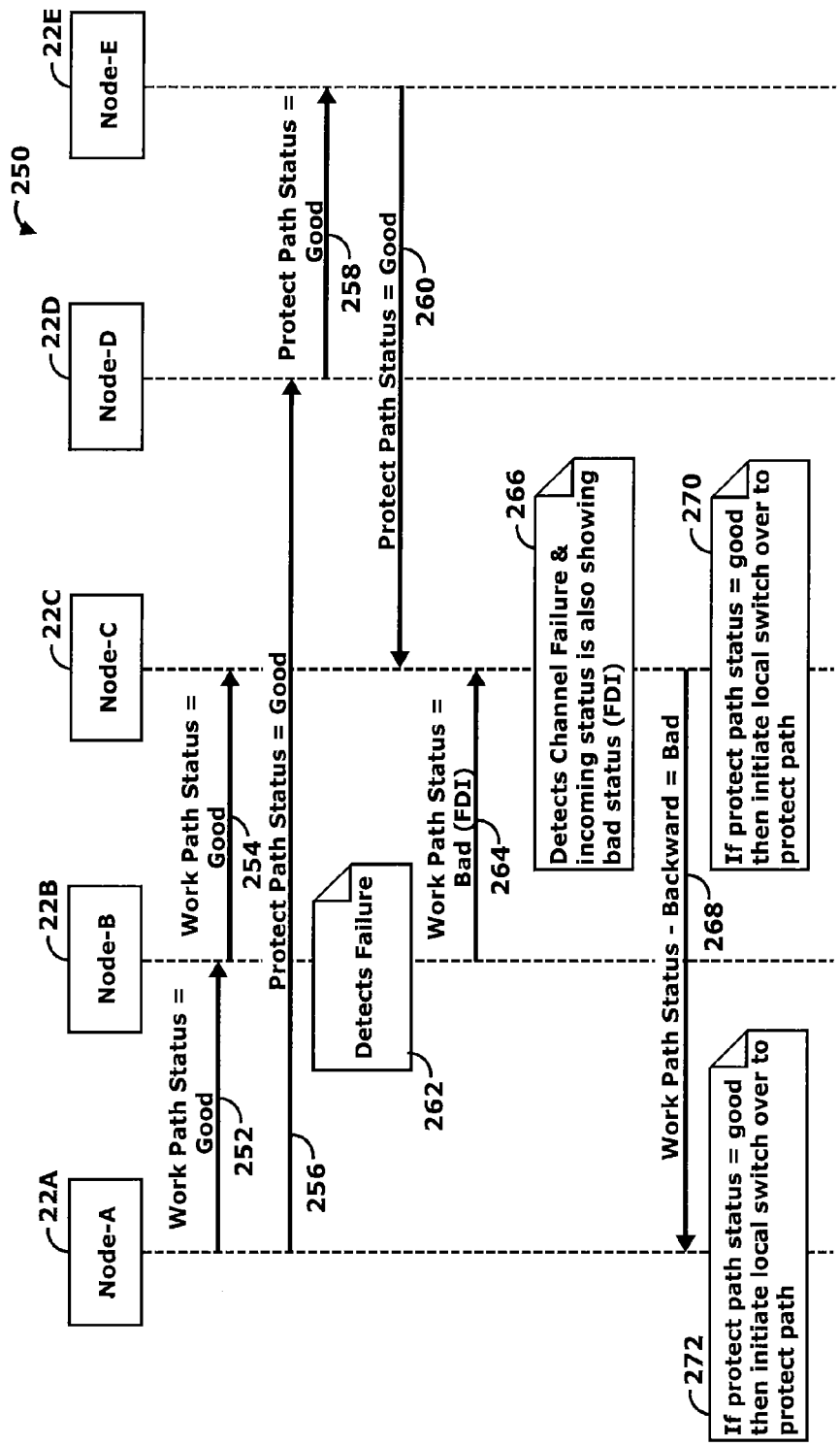
FIG. 7 is a flow diagram of exemplary process sequence in the optical transport network of FIG. 1.

FIG. 7 is a flow diagram of exemplary process sequence 250 in the optical transport network 20 of FIG. 1. Initially, the status of the working path 34 between headend node 22A and tailend node 22C through intermediate node 22B is good, with no failures. The status of the working path 34 is transmitted in the overhead of the OSC 32, as represented by arrows 252 and 254, between the nodes 22A-22C in the working path 34. Additionally, the status of protection path 36 between headend node 22A and tailend node 22C through optical nodes 22D and 22E is good, with no failures. The status of the protection path 36 is transmitted in the overhead of the OSC 32 between the optical nodes 22A, 22D, 22E, 22C, as represented by arrows 256, 258, and 260. Then, in sequence 262, the intermediate node 22B detects the failure "X" in the working path 34, by monitoring the OAM information from the OSC 32 as well as data traffic status information from the line card 56, multiplex card(s) 61, demultiplex card(s) 63, and/or amplifier card(s) 65. In sequence 264, the intermediate node 22B sends a Forward Defect Indication (FDI) over the optical control channel in the overhead of the OSC 32 to the tailend node 22C.

In sequence 266, the tailend node 22C may detect the failure "X" of the working path 34 by monitoring the OAM information from the OSC 32 as well as status information from the line card 56 (and/or multiplex card(s) 61, demultiplex card(s) 63, and/or amplifier card(s) 65), and receives the FDI from the OSC 32 from intermediate node 22B indicating the failure "X". As indicated by sequence 268, the tailend node 22C sends a BDI to the headend node 22A over the optical control channel in the overhead of the OSC 32. Additionally, the intermediate node 22B may send a BDI, received from tailend node 22C, to the headend node 22A over the optical control channel in the overhead of the OSC 32.

In sequences 270 and 272, the headend node 22A and the tailend node 22C check the status of the protection path 36, by monitoring the OAM information from the OSC 32 as well as status information from the line card 56, as previously described. If the status is good (no failures in the protection path 36), then the headend node 22A and the tailend node 22C switch to the protection path 36 as the provider of the data traffic. Both the headend node 22A and the tailend node 22C may switch, even if the failure is simply uni-directional failure.

Figure 8:
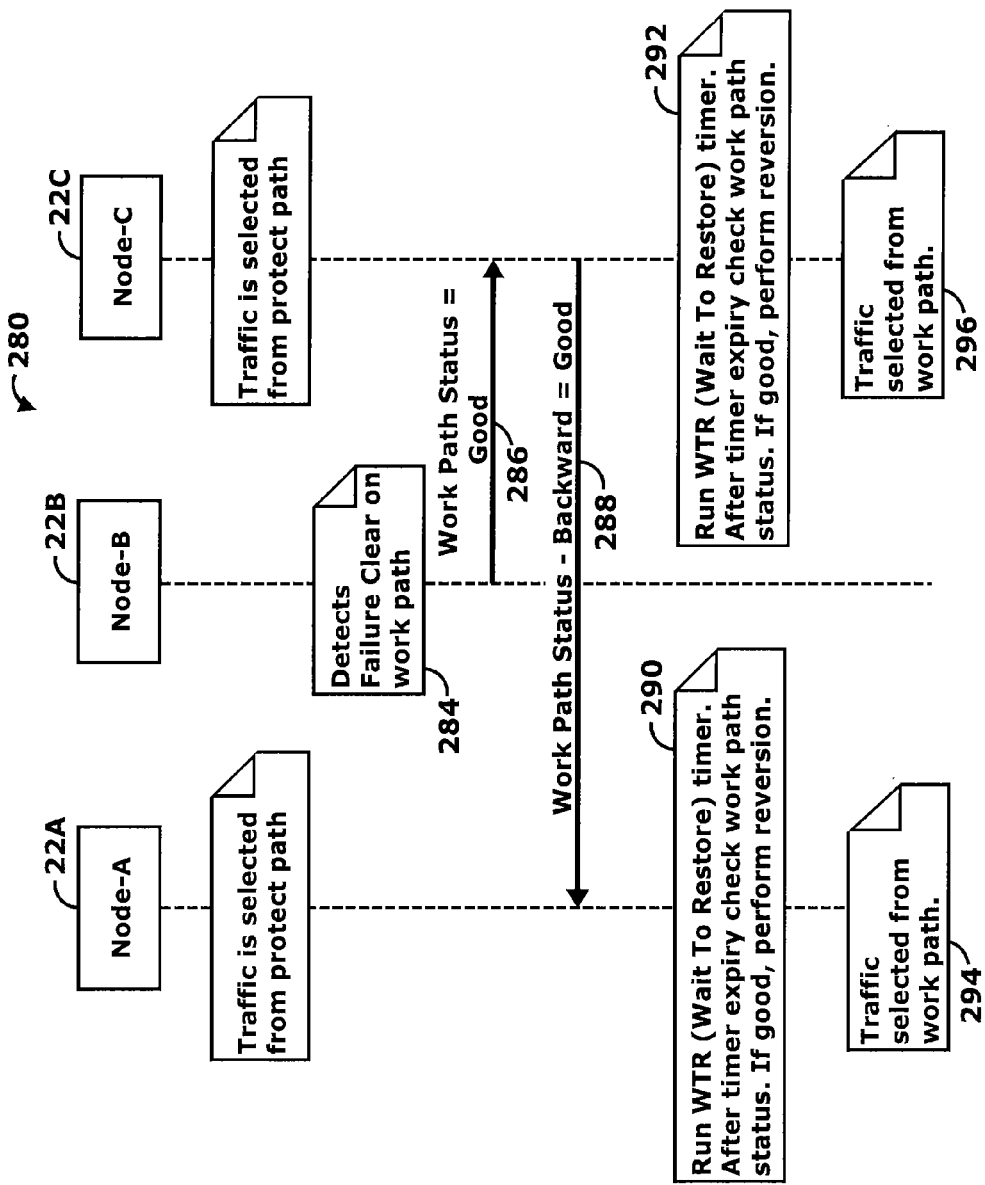
FIG. 8 is a flow diagram of another exemplary process sequence in the optical transport network of FIG. 1.

FIG. 8 illustrates a flow diagram of another exemplary process sequence 280, in which, after the headend node 22A and the tailend node 22C switch to the protection path 36 as discussed in relation to FIG. 7, the headend node 22A and the tailend node 22C may both revert back to the working path 34 after the failure "X" clears. For example, in sequence 284, the optical node 22B, monitoring the OAM information from the OSC 32 and monitoring status information from the line card 56, multiplex card(s) 61, demultiplex card(s) 63, and/or amplifier card(s) 65, detects that the failure "X" on the working path 34 has been cleared. In sequence 286, the optical node 22B detects that the failure "X" in the working path 34 is cleared, by monitoring the OAM information from the OSC 32 as well as status information from the line card 56 (and/or multiplex card(s) 61, demultiplex card(s) 63, and/or amplifier card(s) 65).

In sequence 286, the optical node 22B sends an indication of the cleared status of the working path 34, and/or stops sending the FDI, over the optical control channel in the overhead of the OSC 32 to tailend node 22C.

In sequence 288, the tailend node 22C sends an indication of the cleared status of the working path 34 over the optical control channel in the overhead of the OSC 32 to the headend node 22A. Additionally, the intermediate node 22B may send an indication of the cleared status of the working path 34 and/or, stop sending the BDI, to the headend node 22A over the optical control channel in the overhead of the OSC 32.

Both the headend node 22A and the tailend node 22C, in sequences 290 and 292, may run a wait-to-restore (WTR) timer after receiving notification of the cleared status of the working path 34. After the timer expires, the headend node 22A and the tailend node 22C may check the status of the working path 34 to ensure that the failure "X" has truly been resolved, by monitoring the OAM information from the OSC 32 and monitoring status information from the line card 56.

As shown in sequences 294 and 296, if the status of the working path 34 is good, the headend node 22A and the tailend node 22C both select the working path 34 as the provider of the data traffic. This bi-directional reversion is useful, for example, in low latency applications where both directions of data traffic experience the same amount of delays.

If the protection path 36 fails before the WTR timer expires, the headend node 22A and the tailend node 22C may switch back to the working path 34 as the provider of the data traffic, without waiting for the WTR timer to expire.

It will be understood in dedicated protection schemes that the protection path 36 may continue to carry a duplicate of the data traffic.

Figure 9:
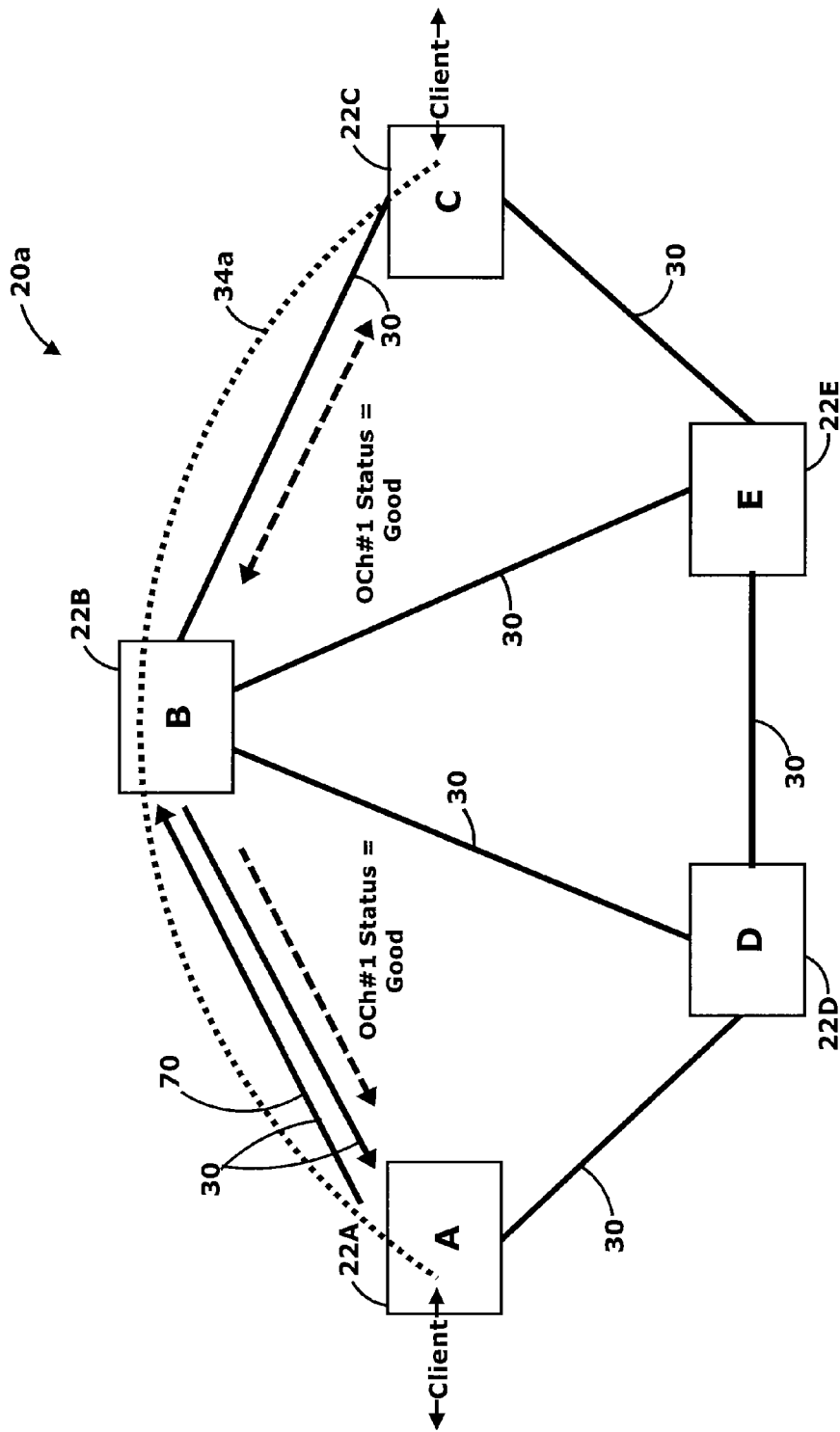
FIG. 9 is an illustration of another exemplary optical transport network in accordance with the present disclosure.

FIG. 9 is a block diagram of an exemplary optical transport network 20a, similar to optical transport network 20, except that the protection path 36 or a restoration path 36a is not originally established. Rather, GMPLS is used to dynamically setup an optical working path 34a, referred to as an Optical-SubNetwork Connection (O-SNC). The working path 34a may be configured at headend node 22A and setup from headend node 22A. GMPLS uses OSPF-TE to discover topology information and RSVP-TE to signal for optical path setup. In this example, restoration features allow recovery of the data traffic in case of a failure along the working path 34a. The restoration performed by the headend node 22A is triggered by detection of a failure. That is, in this case the headend node 22A waits to configure and setup the restoration path 36a until there is a known failure. The failure may be detected by monitoring the OAM information from the OSC 32 and monitoring data traffic status information from the line card 56, multiplex card(s) 61, demultiplex card(s) 63, and/or amplifier card(s) 65.

Figure 10:
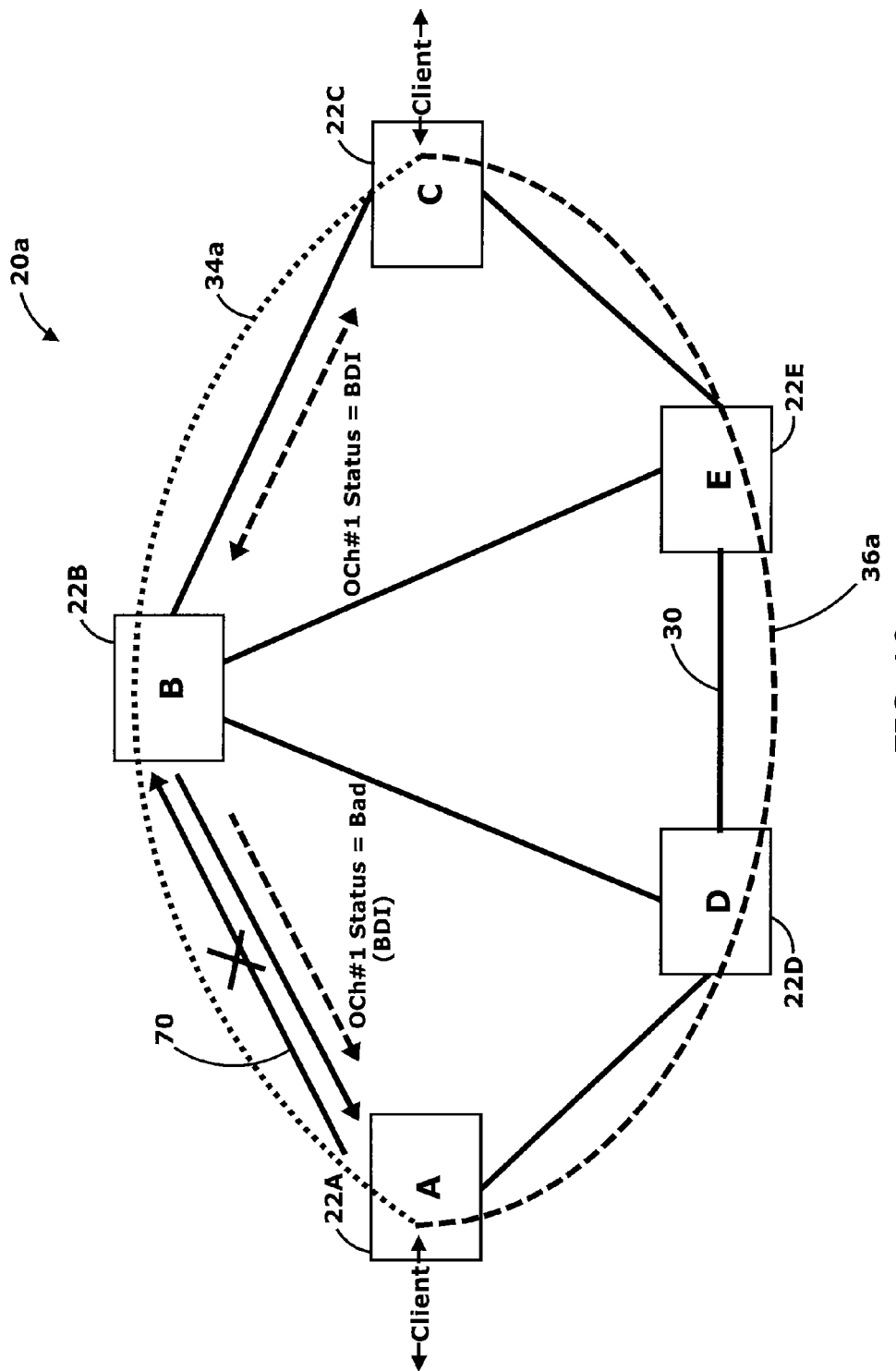
FIG. 10 is an illustration of a failure in the exemplary optical network of FIG. 9.

For example, FIG. 10 illustrates the exemplary optical transport network 20a of FIG. 9 in which a failure, designated as "X", has occurred in the optical transport network 20a, such as a cut in uni-directional fiber 70 in communication link 30 between optical node 22A and optical node 22B in the working path 34a. The optical nodes 22A, 22B, and 22C in the working path 34a are monitoring the overhead in the OSC 32. The OSC 32 terminates at the optical nodes 22A, 22B, and 22C, and the OAM information is extracted from the OSC 32. The optical nodes 22A, 22B, and 22C are also monitoring the data traffic in the working path 34, such as with the firmware in the line cards 56, multiplex card(s) 61, demultiplex card(s) 63, and/or amplifier card(s) 65.

In the case of uni-directional failure "X" as in the example of FIG. 10, the headend node 22A does not detect the uni-directional failure "X" from monitoring data traffic by the line card 56, since the failure is downstream. Rather, the headend node 22A detects the downstream failure by monitoring the OAM information from the OSC 32. More particularly, the headend node 22A may be notified of the failure through BDI information sent in the OSC 32 from the tailend node 22C and/or intermediate node 22B. Once the BDI information is received, the headend node 22A computes an alternate path for the data traffic, referred to as the restoration path 36a, and switches to the restoration path 36a. In this example, the restoration path 36a is setup between headend node 22A and tailend node 22C through intermediate nodes 22D and 22E. The restoration path 36a is set up dynamically using GMPLS signaling.

In the case of bi-directional failure, the headend node 22A may detect the failure "X" in either, or both of, the data traffic through the line card 56 (and/or multiplex card(s) 61, demultiplex card(s) 63, and/or amplifier card(s) 65) and the OAM information from the OSC 32.

Figure 11:
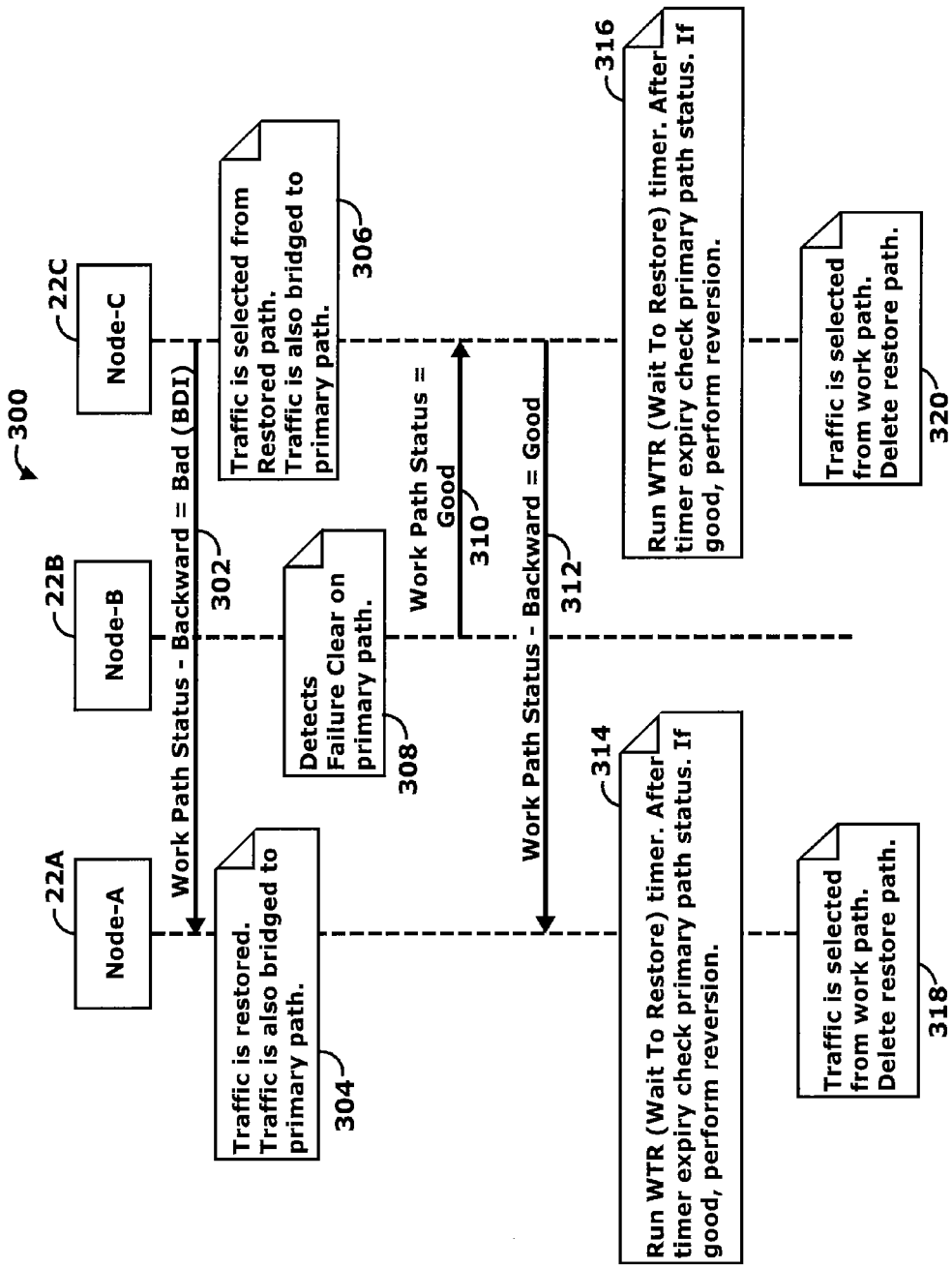
FIG. 11 is a flow diagram of an exemplary process sequence in the optical transport network of FIG. 10.

FIG. 11 is a flow diagram of an exemplary process sequence 300 in the optical transport network 20a of FIG. 10. As described in regards to FIG. 10, in this example, in sequence 302, the tailend node 22C transmits in the OSC 32 Backward Detection Indication (BDI) of the failure "X" to the headend node 22A. Again, the intermediate node 22B may also transmit in the OSC 32 Backward Detection Indication (BDI) of the failure to the headend node 22A. The headend node 22A has restored the data traffic on restoration path 36a, as indicated in sequence 304. Tailend node 22C has selected the restoration path 36a as the provider of the data traffic, as indicated in sequence 306. In this example the data traffic is also still bridged to the original working path 34a by the headend node 22A and the tailend node 22C. That is, the same data traffic is still broadcast to both the original working path 34a and the new restoration path 36a.

In sequence 308, the optical node 22B detects that the failure in the working path 34a is cleared, by monitoring the OAM information from the OSC 32, and may also be detected by monitoring the status information from the line card 56, multiplex card(s) 61, demultiplex card(s) 63, and/or amplifier card(s) 65. In sequence 310, the optical node 22B sends an indication of the cleared status of the working path 34a, and/or stops sending the FDI, over the optical control channel in the overhead of the OSC 32 to tailend node 22C.

In sequence 312, the optical node 22C sends an indication of the cleared status of the working path 34a over the optical control channel in the overhead of the OSC 32 to the headend node 22A. Additionally, the intermediate node 22B may send an indication of the cleared status of the working path 34a and/or, stop sending the BDI, to the headend node 22A over the optical control channel in the overhead of the OSC 32.

Both the headend node 22A and the tailend node 22C, in sequences 314 and 316, may run a wait-to-restore (WTR) timer after receiving notification of the cleared status of the working path 34a. After the timer expires, the headend node 22A and the tailend node 22C may check the status of the working path 34a to ensure that the failure has truly been resolved, by monitoring the OAM information from the OSC 32 and monitoring status information from the line card 56. If the restoration path 36a were to fail during the running of the timer, the headend node 22A and the tailend node 22C may switch back to the working path 34a before the timer expires, as long as the status of the working path 34a is good.

As shown in sequences 318 and 320, if the status of the working path 34a is good, the headend node 22A and the tailend node 22C both select the working path 34a as the provider of the data traffic. The restoration path 36a may then be deleted and its resources released to the optical transport network 20a.

Further, in prior art systems, a failure of an incoming client signal, for example, to headend node 22A, could trigger the headend node 22A and tailend node 22C to switch to receiving traffic from the protection path 36 and/or restoration path 36a unnecessarily. By using the previously disclosed protection and recovery mechanisms utilizing the overhead bytes of the OSC 32 to transmit status and failure data, the headend node 22A and tailend node 22C detect failures in the client signal entering the optical transport network 20, 20a. Upon detection, the headend node 22A may write the client failure information into the overhead of the OSC 32 and transmit the information via the OSC 32 to one or more other optical nodes 22B-22n in the optical transport network 20, 20a. With this information, the nodes 22A-22n may avoid unnecessary switching to alternate paths.

The examples described above are not exclusive as to the use of the present invention. OAM information for optical layers transmitted at the optical level in coherent optical transport networks 20 may be useful in other status monitoring, dedicated protection, fast restoration, and reversion situations, for example.

CONCLUSION

Currently, optical transport systems use digital layer mechanisms for path recovery; however, there are no mechanisms or protocols defined for supporting protection functions in Optical Layers (OMS and OCh layers). In accordance with the present disclosure, methods and apparatus are described for supporting protection functions in Optical Layers using OAM information for the optical layers carried over an optical channel.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

In addition, information regarding the optical channel (OCh) or Super Channel (SCh) label switched paths can be stored and processed in a distributed fashion, or in a centralized fashion. Frequency slot information can be stored in a distributed fashion (distributed storage having multiple memory/storage devices) and processed in a distributed manner preferably by using a hop-to-hop processing. In another implementation, distributed storage may be replaced by a centralized memory that stores the frequency slot information for all, or a subset, of the nodes. In this situation, the nodes may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A method comprising the steps of:
   receiving, by circuitry of a first optical node adapted for wavelength multiplexing and wavelength switching, an optical signal over an optical control channel, wherein the optical control channel is an optical supervisory channel with an optical carrier (OC-N) frame format, the optical signal comprising overhead, the overhead comprising information indicative of status of at least one of an optical layer in an optical transport network;
   terminating, by the circuitry of the first optical node, the optical signal at the first optical node;
   providing notification, by the circuitry of the first optical node, of the status of the optical layer in the optical transport network;
   detecting, by the circuitry of the first optical node, based on the status of the optical layer, a failure being at least one of a uni-directional failure and a bi-directional failure of a working path between the first optical node and a second optical node in the optical transport network, wherein the working path carries first data traffic between the first optical node and the second optical node in the optical transport network when there is no failure in the working path;
   switching, by the circuitry of the first optical node, triggered by the failure of the working path, to select second data traffic from a protection path, wherein the protection path carries second data traffic between the first optical node and the second optical node in the optical transport network;
   switching, by the circuitry of the second optical node, triggered by the failure of the working path, to select the second data traffic from the protection path;
   detecting, based on the received status of the optical layer, a correction of the failure of the working path;
   timing, by circuitry of the first optical node, a delay of a predetermined time;
   determining, based on the received status of the optical layer, that the working path is functional; and
   switching, by circuitry of the first optical node and the second optical node, the data traffic to the working path after the predetermined time.

2. The method of claim 1, wherein the optical carrier (OC-N) frame format is concatenated (OC-3c) with a synchronous transport signal frame format.

3. The method of claim 2, wherein assignment of bits to bytes within a transport overhead portion of the synchronous transport signal frame format within the optical carrier (OC-N) frame format is carried out by software or by hardware code.

4. The method of claim 1, wherein the second data traffic is a duplicate of the first data traffic, and the first data traffic and the second data traffic are transmitted simultaneously on the working path and the protection path.

5. The method of claim 1, wherein the first optical node calculates the protection path when the failure is detected and wherein the second data traffic is carried by the protection path only after the failure in the working path.

6. The method of claim 1, further comprising:
   detecting, based on the received status of the optical layer, correction of the failure of the working path; and
   switching, by circuitry of the first optical node and the second optical node, the data traffic to the working path.

7. The method of claim 1, further comprising checking, based on the status of the optical layer, the status of the protection path before switching the data traffic.

8. A first optical node adapted for wavelength multiplexing and wavelength switching, comprising:
   one or more input interface;
   one or more output interface; and
   one or more control module controlling the input interface and the output interface, the control module:
   receiving, through the one or more input interface of the first optical node, an optical signal over an optical control channel, wherein the optical control channel is an optical supervisory channel with an optical carrier (OC-N) frame format, the optical signal comprising overhead, the overhead comprising information indicative of status of at least one of an optical layer in an optical transport network;
   terminating, by circuitry of the first optical node, the optical signal at the first optical node;
   providing notification, by the circuitry of the first optical node, of the status of the optical layer in the optical transport network;
   detecting, by the circuitry of the first optical node, based on the status of the optical layer, a failure being at least one of a uni-directional failure and a bi-directional failure of a working path between the first optical node and a second optical node in the optical transport network, wherein the working path carries first data traffic from the first optical node to the second optical node in the optical transport network when there is no failure in the working path; and
   switching, by the circuitry of the first optical node, triggered by the failure of the working path, to select the data traffic from a protection path, wherein the protection path carries second data traffic between the first optical node and the second optical node in the optical transport network;
   detecting, based on the received status of the optical layer, a correction of the failure of the working path;
   timing, by circuitry of the optical node and the second optical node, a delay of a predetermined time;

determining, based on the received status of the optical layer, that the working path is functional; and
switching, by circuitry of the optical node and the second optical node, to selecting the data traffic from the working path after the predetermined time.

9. The optical node of claim 8, wherein the optical carrier (OC-N) frame format is concatenated (OC-3c) with a synchronous transport signal frame format.

10. The optical node of claim 9, wherein assignment of bits to bytes within a transport overhead portion of the synchronous transport signal frame format within the optical carrier (OC-N) frame format is carried out by software or by hardware code.

11. The optical node of claim 8, wherein the second data traffic is a duplicate of the first data traffic, and the first data traffic and the second data traffic are transmitted simultaneously on the working path and the protection path.

12. The optical node of claim 8 wherein the optical node calculates the protection path when the failure is detected and wherein the data traffic is carried by the protection path only after the failure in the working path.

13. The optical node of claim 8, further comprising:
detecting, based on the received status of the optical layer, correction of the failure of the working path; and
switching, by circuitry of the first optical node and the second optical node, to selecting the data traffic from the working path.

14. The optical node of claim 8, further comprising checking, based on the status of the optical layer, the status of the protection path before switching to select the second data traffic from a protection path.

15. The optical node of claim 8, further comprising transmitting, with circuitry of the optical node, one or more optical signals over the optical control channel indicative of the status of the optical layer, based on the received status of the optical layer, at least to the second node.

16. The optical node of claim 8, wherein detecting the failure is also based on status information from circuitry of the optical node.

17. An optical transport network adapted for wavelength multiplexing and wavelength switching, comprising:
a first optical node having first circuitry configured to:
receive an optical signal over an optical control channel, wherein the optical control channel is an optical supervisory channel with an optical carrier (OC-N) frame format, the optical signal comprising overhead, the overhead comprising information indicative of status of at least one of an optical layer in an optical transport network;
terminate the optical signal at the first optical node;
provide notification of the status of the optical layer in the optical transport network and detect, based on the status of the optical layer, a failure being at least one of a uni-directional failure and a bi-directional failure of a working path between the first optical node and a second optical node in the optical transport network, wherein the working path carries first data traffic from the first optical node to the second optical node in the optical transport network when there is no failure in the working path; and
switch, when triggered by the failure of the working path, to select second data traffic from a protection path, wherein the protection path carries the second data traffic between the first optical node and the second optical node in the optical transport network;
detect, based on the received status of the optical layer, a correction of the failure of the working path;
time a delay of a predetermined time;
determine, based on the received status of the optical layer, that the working path is functional; and
switch to select the second data traffic from the working path after the predetermined time; and
a second optical node having second circuitry configured to switch, when triggered by the failure of the working path, to select the second data traffic from the protection path.

18. The optical transport network of claim 17, wherein the first circuitry of the first optical node is further configured to:
transmit, with circuitry of the first optical node, one or more optical signals over the optical control channel indicative of the status of the optical layer.

* * * * *